United States Patent
Seurer et al.

(10) Patent No.: US 10,173,671 B2
(45) Date of Patent: Jan. 8, 2019

(54) SENSOR CALIBRATION IN A PARKING FACILITY

(71) Applicant: Continental Teves AG & Co. oHG, Frankfurt (DE)

(72) Inventors: Frank Seurer, Bad Vilbel (DE); Adam Swoboda, Groß-Gerau (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 62 days.

(21) Appl. No.: 15/510,076

(22) PCT Filed: Sep. 23, 2015

(86) PCT No.: PCT/EP2015/071889
§ 371 (c)(1),
(2) Date: Mar. 9, 2017

(87) PCT Pub. No.: WO2016/046271
PCT Pub. Date: Mar. 31, 2016

(65) Prior Publication Data
US 2017/0305417 A1    Oct. 26, 2017

(30) Foreign Application Priority Data

Sep. 25, 2014 (DE) .......................... 10 2014 219 382

(51) Int. Cl.
*B60W 30/00* (2006.01)
*B60W 30/06* (2006.01)
(Continued)

(52) U.S. Cl.
CPC ............. *B60W 30/06* (2013.01); *G01C 25/00* (2013.01); *G05D 1/0278* (2013.01); *G08G 1/096725* (2013.01); *G08G 1/141* (2013.01)

(58) Field of Classification Search
CPC ....... B60W 30/00; B60W 30/06; G01C 25/00; G01C 21/00; G01C 21/206; G01C 21/34;
(Continued)

(56) References Cited

U.S. PATENT DOCUMENTS 8,820,160 B2  9/2014  Doering et al.
9,014,921 B2  4/2015  Bretzigheimer et al.
(Continued)

FOREIGN PATENT DOCUMENTS

DE    19809416 A1    9/1999
DE    102006029148 A1    1/2008
(Continued)

OTHER PUBLICATIONS

International Search Report and Written Opinion for International Application No. PCT/EP2015/071889, dated Dec. 22, 2015, 7 pages.
(Continued)

*Primary Examiner* — Yonel Beaulieu
(74) *Attorney, Agent, or Firm* — RatnerPrestia

(57) ABSTRACT

A method for calibrating an internal sensor in a vehicle with an external sensor which is designed to detect external positional data dependent on a position of the vehicle. The method includes: detecting the external positional data using the external sensor; sending the external positional data to the vehicle and filtering the internal positional data based on the external positional data and dependent on the position of the vehicle and by an internal sensor.

10 Claims, 4 Drawing Sheets

(51) Int. Cl.
*G05D 1/00* (2006.01)
*G01C 25/00* (2006.01)
*G08G 1/0967* (2006.01)
*G08G 1/14* (2006.01)
*G05D 1/02* (2006.01)

(58) Field of Classification Search
CPC .......... G05D 1/00; G05D 1/0278; G08G 1/00; G08G 1/096725; G08G 1/141
See application file for complete search history.

(56) References Cited

U.S. PATENT DOCUMENTS

| | | | |
|---|---|---|---|
| 9,429,439 B2* | 8/2016 | Stumper | G01C 21/00 |
| 2003/0122687 A1 | 7/2003 | Trajkovic et al. | |
| 2010/0156672 A1 | 6/2010 | Yoo et al. | |
| 2015/0219462 A1* | 8/2015 | Stumper | G01C 21/00 701/410 |
| 2015/0369608 A1 | 12/2015 | Stahlin et al. | |

FOREIGN PATENT DOCUMENTS

| | | |
|---|---|---|
| DE | 102011080789 A1 | 2/2012 |
| DE | 102012016867 A1 | 9/2013 |
| DE | 102012112442 A1 | 6/2014 |
| DE | 102012224107 A1 | 6/2014 |
| WO | 2010037810 A1 | 4/2010 |
| WO | 2014029490 A1 | 2/2014 |

OTHER PUBLICATIONS

German Search Report for German Application No. 10 2014 219 382.6, dated Apr. 16, 2015, including partial English translation, 9 pages.

International Preliminary Report on Patentability and Written Opinion for International Application No. PCT/EP2015/071889, dated Mar. 28, 2017, including English translation, 11 pages.

* cited by examiner

SENSOR CALIBRATION IN A PARKING FACILITY

CROSS REFERENCE TO RELATED APPLICATIONS

This application is the U.S. National Phase Application of PCT International Application No. PCT/EP2015/071889 filed Sep. 23, 2015, which claims priority to German Patent Application No. 10 2014 219 382.6, filed Sep. 25, 2014, the contents of such applications being incorporated by reference herein.

FIELD OF THE INVENTION

The invention relates to a method for calibrating a vehicle, a control device for carrying out the method, the vehicle with the control device and a system for implementing the method.

BACKGROUND OF THE INVENTION

From DE 102012016867 A1, which is incorporated by reference, a parking assistance system for parking a vehicle is known. It comprises a stationary verification and monitoring device able to wirelessly connect with a vehicle, configured to monitor an automatic parking maneuver.

SUMMARY OF THE INVENTION

An aspect of the invention aims to improve the use of the parking assistance system.

According to an aspect of the invention, a method for calibrating an internal sensor in a vehicle with an external sensor, which is designed to detect external positional data dependent on a position of the vehicle, comprises:
  detecting the external positional data using the external sensor;
  sending the external positional data to the vehicle; and
  filtering internal positional data detected by the internal sensor and dependent on the position of the vehicle based on the external positional data.

The indicated method is based on the idea that using stationary verification and monitoring devices, like those known from the parking assistance systems mentioned above, via the wireless connection with the vehicle the positional data of the vehicle can be redundantly detected. On the basis of this redundant detection, the internally detected positional data and thus the internal sensor can be synchronized, for, by way of example, fault finding, calibrating the internal sensor or, by way of example, in the course of a sensor fusion, generally refining the positional data of the vehicle. In this way, the use of the external positional data can be extended.

In a further development of the method indicated, the external sensor is arranged in a parking facility, particularly a multi-storey parking lot, for tracking the vehicle and can thus be used in a stationary verification and monitoring device of a parking assistance system, like the abovementioned parking assistance system. Here the external sensor is then used as part of a guidance system for the vehicle in the multi-storey parking lot, to guide the vehicle to a parking space in the multi-storey parking lot.

Alternatively, the external sensor can also be used in a parking facility for the temporary storage of finished vehicles at the end of a production line. In the course of this temporary storage, by using the method indicated and in a particularly advantageous manner, when a newly produced vehicle is parked in a parking space of the parking facility the internal sensor is calibrated in-situ upon switching off, or a calibration already performed at the end of the line can be automatically checked.

In another further development of the indicated method, the internal positional data are checked with the filtering based on the external positional data. In this way, errors in the detection of the position of the vehicle and the description by the internal positional data can be discovered which, by way of example, are caused by aging effects and/or by the effects of changes in the installation position. Changes in the installation position can, by way of example, occur as a result of a change in the sensor geometry during accidents or similar involving the vehicle and are generally not considered in the subsequent operation of the vehicle. Specifically, in highly accurate ADAS driver assistance systems, such as, for example, an automatic parking assistant, even minor errors must be avoided, however, since these can limit the performance of ADAS functions in vehicles very considerably.

In a particular further development, the method indicated comprises the step of calibrating a sensor detecting the internal positional data in the vehicle based on the checking. In this way the abovementioned errors can be automatically corrected. In this way, more robust operation of ADAS functions in vehicles can be ensured much more reliably.

In yet another further development of the method indicated, the external positional data are designed to describe an absolute position of the vehicle. Here the positional data describing the absolute position can be provided on a receiver of a Global Navigation Satellite System, or GNSS, signal. This can, by way of example, take place upon leaving the abovementioned multi-storey parking lot, in which no GNSS signal is usually receivable. Through the absolute position of the vehicle provided, here the GNSS receiver can, upon leaving the multi-storey parking lot, when a GNSS signal is received again, locate the vehicle more quickly and supply values for the absolute position of the vehicle.

According to a further aspect of the invention, a control device is designed to carry out one of the methods indicated.

In a further development of the control device indicated, the device indicated comprises a memory and a processor. Here the method indicated is stored in the form of a computer program in the memory, and the processor is provided for carrying out the method, when the computer program is loaded from the memory into the processor.

According to a further aspect of the invention, a computer program comprises program code means for carrying out all steps of one of the methods indicated, when the computer program is executed on a computer or one of the devices indicated.

According to a further aspect of the invention a computer program product contains a program code, stored on a machine-readable data carrier and which, when executed on a data processing device, carries out one of the processes indicated.

According to another aspect of the invention, a vehicle comprises an indicated control device.

According to a further aspect of the invention, the object is achieved by means of a system for carrying out a method according to one of the abovementioned embodiments. The system comprises means for detecting a vehicle. These means are permanently installed. The means are further supplied with information sent to the vehicle. The system further comprises an arithmetic and logical unit to determine and provide the information to be sent. The system furthermore comprises a control device to be fitted in a vehicle.

BRIEF DESCRIPTION OF THE DRAWINGS

The characteristics, features and advantages of this invention described above, and the way in which these are achieved, will become clearer and more understandable through the following description of the embodiments, explained in more detail by reference to the drawings, in which.

DETAILED DESCRIPTION OF THE PREFERRED EMBODIMENTS

Figure 1:
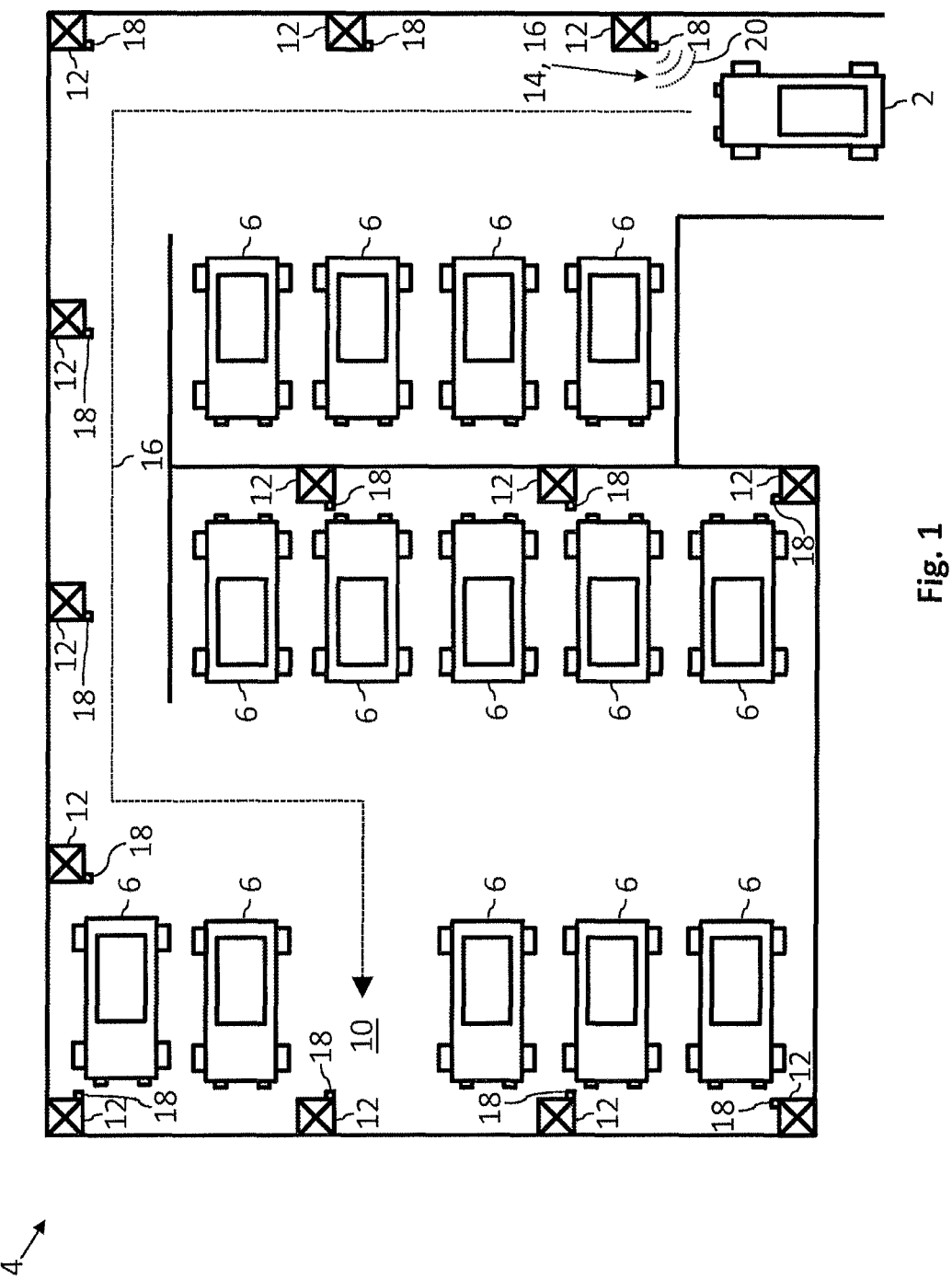
FIG. 1 is a schematic diagram of a vehicle in a multi-storey parking lot.

Identical technical elements are given the same reference numerals in the figures, and described only once.

Reference is made to FIG. 1, in which a vehicle 2 in a multi-storey parking lot 4 is shown in a schematic diagram.

As can be seen in FIG. 1, a number of other vehicles 6 can park in the multi-storey parking lot 4. To park the vehicle 2 in the multi-storey parking lot 4, a route 16 to a parking space 10 between the already parked vehicles 6 must be found. The vehicle 2 must then be moved along this route 16 to the parking space 10 and parked in the parking space 10.

In the present embodiment, in the multi-storey parking lot 4 there is a parking assistant with a plurality of external position sensors 12 distributed through the multi-storey parking lot 4. The external position sensors 12 externally detect the position of vehicle 2 and describe this in positional data, which are therefore referred to in the following as external positional data 14. The positional sensors 12 also report the external positional data 14 and thus the position of the vehicle 2 to a higher-order evaluation device (not shown). The evaluation device knows all free parking spaces 10 in the multi-storey parking lot 4 and based on the position of the vehicle 2 described with the external positional data 14 and the location of the parking space 10 calculates the route 16 to this and indicates this as a reference variable to the vehicle 2.

Each position sensor 12 in the multi-storey parking lot 4 has a radio antenna 18, with which the parking assistant can send the route 16 as a reference variable and/or the external positional data 14 of the vehicle 2 as actual data in a radio signal 20 to the vehicle 2.

Based on the specified route 16 as reference variable and the external positional data 14 as actual data, the vehicle 2 can then, in a Highly Automated Driving (HAD) function, perform a suitable control action on the vehicle 2, guide the vehicle 2 along the route 16 and park it in the parking space 10. This means that the entire parking maneuver can be driverless.

As already stated, the external positional data 14 represent external sensor information from the perspective of the vehicle 2. This must be distinguished from internal sensor information from the perspective of the vehicle 2, detected by sensors present inside the vehicle 2. A few examples of this are given below using FIG. 2.

The vehicle 2 comprises a chassis 20 and four wheels 22. Each wheel 22 can be rotated individually by means of an electric motor 24 secured permanently to the chassis 20, to move the vehicle 2 in a movement direction 26 along the route 16 in the multi-storey parking lot 4

Here a loss of traction of the wheels 22 of the vehicle 2 and an associated deviation by the vehicle 2 from a trajectory specified by a steering signal 28 yet to be described, through understeering or oversteering, can be avoided by vehicle dynamics control 30. The vehicle dynamics control 30, like the abovementioned HAD function, is one of the driver assistance functions of what is known as ADAC.

In the present embodiment, the vehicle 4 has speed sensors 32 on the wheels 22 for the vehicle dynamics control 30, each detecting a speed 34 of the wheels 22. The speeds 34 are an example of the abovementioned internal sensor information and are therefore internal sensor data from the perspective of the vehicle 2. The vehicle 2 also comprises a vehicle dynamics sensor 35 outputting vehicle dynamics data 33, which similarly represent internal sensor information and are therefore internal sensor data from the perspective of the vehicle 2.

Based on the detected speeds 34 and the vehicle dynamics data 33, a controller 36 can determine in a manner known to a person skilled in the art, if the vehicle 2 slides in the lane or even deviates from the abovementioned trajectory, and respond accordingly with an in itself known controller output signal 38. The controller output signal 38 can then be used by a controlling element 40, to drive actuators, by means of actuating signals 42, such as the electric motors 24, which respond to slipping and deviation from the specified trajectory in a known manner, by way of example through torque-vectoring. Further details and alternative design possibilities of the vehicle dynamics control 30 can be inferred from DE 10 2011080789 A1, which is incorporated by reference.

The HAD function is implemented in a suitable arithmetic and logical device with reference numeral 44, referred to in the following as the HAD function 44. The HAD function 44 can obtain the route 16 to the parking space 10 as a reference variable and the external positional data 14 as actual data, from a radio receiver 46 yet to be described which receives the corresponding radio signal 20 via a vehicle antenna 47. Essentially, on this basis the HAD function 44 performs a setpoint/actual value comparison and by means of the steering signal 28 and a drive signal 37 intervenes in the vehicle 2, to move the vehicle 2 along the route 16 to the parking space. While by means of the drive signal 37 via the actuator 40 the electric motors 24 for driving the vehicle 2 are being operated, the vehicle 2 is steered with the steering signal 28 via a steering system 50. For the sake of brevity, an additional braking device that is necessary for braking the vehicle 2, and which is similarly actuated by the HAD function 44, is not dealt with in more detail hereinafter.

To be able to respond to any obstacles such as pedestrians or similar on the route 16, the vehicle 2 has a front camera 52 facing in the direction of movement 26 of the vehicle 2, which captures an image 54 at an angle 56 in front of the vehicle 2 and a radar sensor 58, which determines by radar rays 60 a distance 62 to a possible obstacle in front of the vehicle. In the image 54 the HAD function can, together with the distance 62, identify any obstacles in front of the vehicle 2 and with the steering signal 28 and the abovementioned braking device avoid these as necessary. Both the image 54 and the distance 62 represent internal sensor information and thus internal sensor data from the perspective of the vehicle 2. Further details on the HAD function 44 can be inferred, by way of example, from DE 102012112442 A1, which is incorporated by reference.

Figure 2:
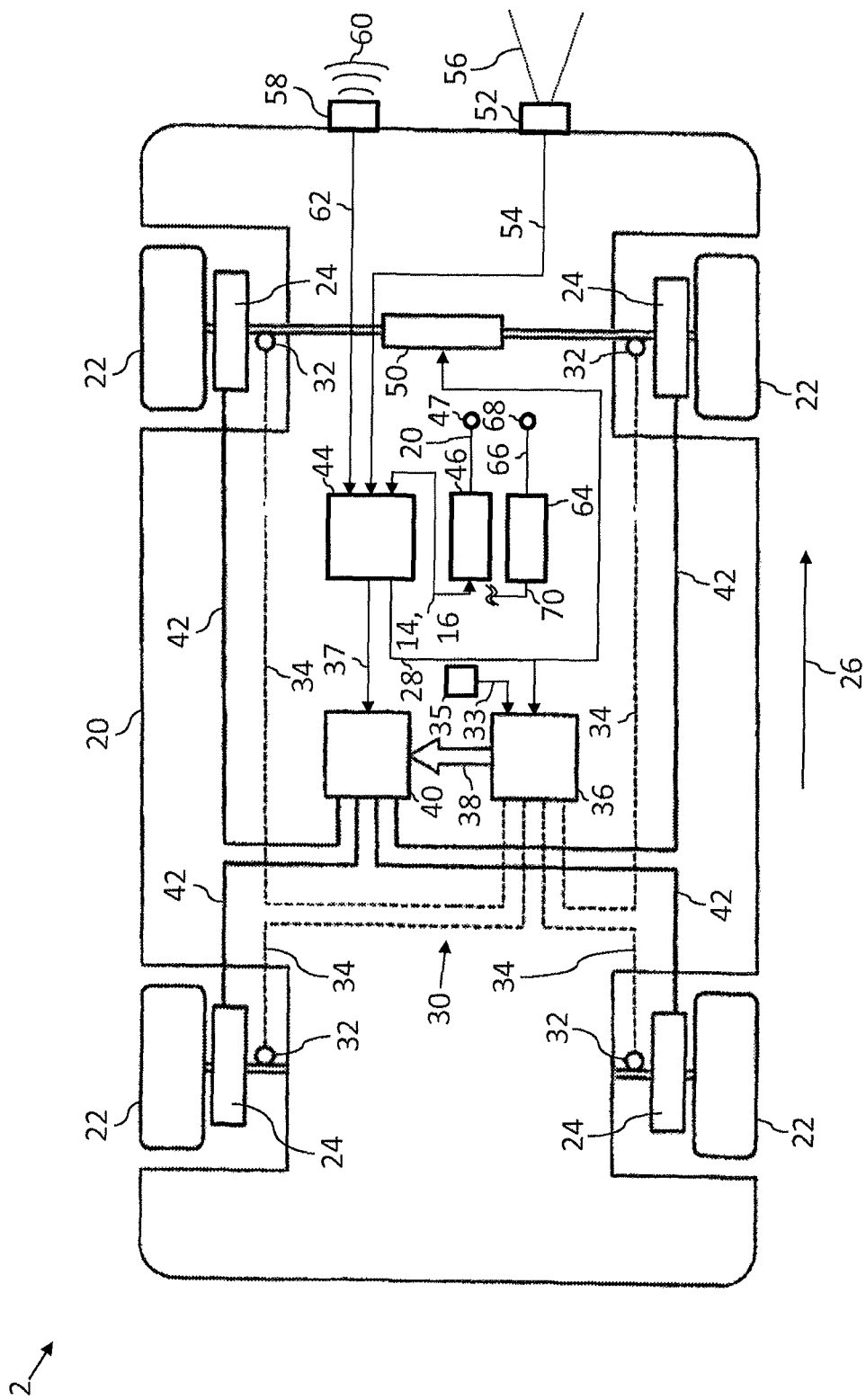
FIG. 2 is a schematic diagram of the vehicle from FIG. 1.

Finally, a GNSS receiver 64 may be present in the vehicle 2 for receiving a corresponding GNSS signal via a GNSS antenna 68 from a Global Navigation Satellite System (GNSS). From this GNSS signal 66, the GNSS receiver 64 determines a global position 70 of the vehicle 2. This global position 70 also represents internal sensor information and thus internal sensor data from the perspective of the vehicle 2. In the multi-storey parking lot 4, however, receipt of a GNSS signal 66 is not possible, and as a result the global position 70 cannot be determined either. This is shown in FIG. 2 by a broken line.

Now that the difference between internal sensor data and external sensor data has been explained, the transmission of the external sensor data, thus the external positional data 14 from the multi-storey parking lot 4 to the vehicle 2 in the radio signal 20, will be briefly addressed.

The radio signal 20 can essentially be transmitted via any network structure. In the following, by way of example, what is referred to as a vehicle ad-hoc network is used as an example, for which certain country-specific communication protocols, by way of example in the context of ETSI TC ITS at ETSI in Europe, and in the context of IEEE 1609 at IEEE and at SAE in the United States of America, have been proposed.

Figure 3:
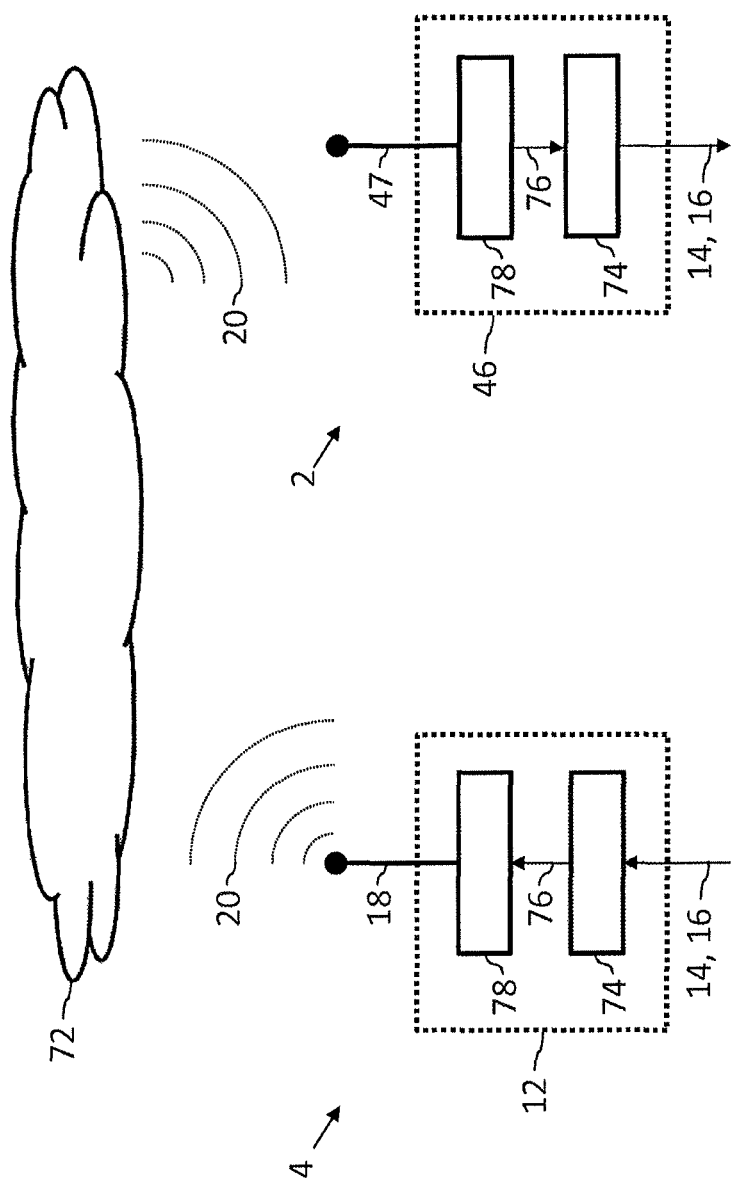
FIG. 3 is a schematic diagram of a vehicle ad-hoc network, in which the vehicle of FIGS. 1 and 2 is able to participate.

Such a vehicle ad-hoc network is also known as a Car2X network and will be explained below in more detail using FIG. 3, in which it is represented in the form of a cloud supporting the radio signal 20 and is given reference numeral 72.

Each position sensor 12 in the multi-storey parking lot 4 comprises a transmitter with two network layers for sending the radio signal 20. A routing layer 74 generates from the data sent, e.g. the external position 14 or the route 16, data packets 76 with a predetermined structure and modulates these in a physical layer 78 on the radio signal 20. Here the structure of the data packets 76 is determined in the above-mentioned specification, wherein to generate the data packets 76 further information, such as, for example, time stamps, may be necessary.

To be able to apply the HAD function 44 in the multi-storey parking lot 4, the positional data 14 detected by the external position sensors 12 of the multi-storey parking lot 4 must describe the external position of the vehicle 2 with high precision. Accordingly, the external positional data 14 are of correspondingly high quality in terms of the tolerance of the external position of the vehicle 2.

In the present embodiment, this high-quality external position 14 is intended to be used to check and/or calibrate internal sensors in the vehicle 2. It is pointed out here that the high-quality external position 14 could also be used at a parking facility at the end of a vehicle manufacturer's production line, to check and/or calibrate internal sensors in the vehicle 2. The multi-storey parking lot 4 is therefore merely one of many possible applications. This will be explained in the following using the vehicle dynamics sensor 35. The following method can essentially be applied to any internal sensor in the vehicle 2, however.

Figure 4:
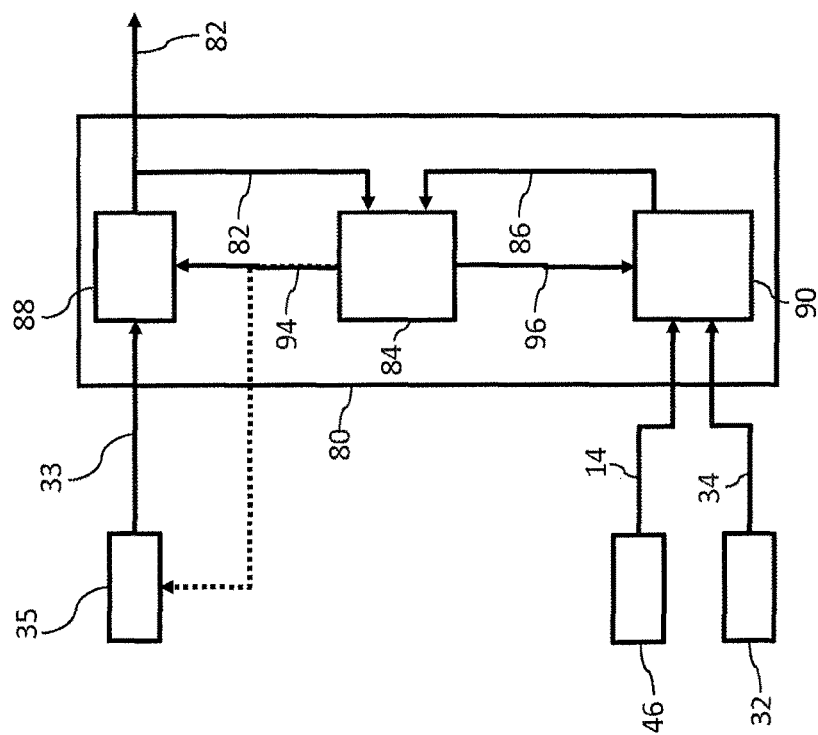
FIG. 4 is a schematic diagram of a fusion sensor in the vehicle of FIGS. 1 and 2.

For this application, a fusion sensor 80 shown in FIG. 4 is used. The basic concept behind the fusion sensor 80 is to compare the external positional data 14 from the radio receiver 46, the internal sensor information, such as the vehicle dynamics data 33 from the vehicle dynamics sensor 35, and the wheel speeds 34 from the wheel speed sensors 32, and to determine a signal-to-noise ratio in at least one of the sensor signals. Based on the signal-to-noise ratio the internal sensors of the vehicle 2 can then be checked and, if necessary, calibrated.

The fusion sensor 80 can also output refined positional data 82 of the vehicle 2 from the received sensor information in the multi-storey parking lot 4. These refined positional data 82 can describe the position of the vehicle 2 in the multi-storey parking lot 2 and its vehicle dynamics in the multi-storey parking lot 2. To determine the refined positional data 82 external positional data 14 from the radio receiver 46 are compared with the vehicle dynamics data 33 from the vehicle dynamics sensor 14 in a filter 84, whereby the signal-to-noise ratio in the external positional data 14 is determined from the radio signal 46 or the vehicle dynamics data 33 from the vehicle dynamics sensor 35. For this the filter 84 can have any design, but a Kalman filter is most effective in achieving this object with a comparatively low demand on computing power. In the following, therefore, the filter 84 will preferably be a Kalman filter 84.

The refined positional data 82 of the vehicle 2 enter the Kalman filter 84 together with comparative positional data 86 of the vehicle 2. The refined positional data 82 are generated in the design in question in, by way of example, a strapdown algorithm 88 known from DE 102006029148 A1, which is incorporated by reference from the vehicle dynamics data 33. In contrast, the comparative positional data 86 are obtained from a model 90 of the vehicle 2, which in the first instance is supplied with the external position data 14 from the radio receiver 46. From the external positional data 14, in the model 90, the comparative positional data 86 are then determined, containing the same information as the refined positional data 82. The refined positional data 82 and the comparative positional data 86 differ merely by their values.

Based on the refined positional data 82 and the comparative positional data 86, the Kalman filter 84 calculates an error budget 92 for the refined positional data 82 and an error budget 94 for the comparative positional data 86. In the following, an error budget is understood to be a total error in a signal, made up of various individual errors in the detection and transmission of the signal. The error budget of a signal can include the deviation from the expected value of the signal and the variance of the signal.

The error budget 94 of the refined positional data 82 and the error budget 96 of the comparative positional data 86 can then be correspondingly used in the strapdown algorithm 88 and in the model 90 for correcting the refined positional data 82 or the comparative positional data 86. This means that the refined positional data 82 and the comparative positional data 86 are corrected iteratively by their errors.

As soon as the vehicle 2 leaves the multi-storey parking lot 4, the external positional data 14 can be replaced by the global position 70 from the GNSS receiver 64, whereby the refined positional data 82 can be immediately updated.

In the context of the present embodiment, the error budget 94 of the refined positional data 82 can be used for setting the vehicle dynamics sensor 35. This is shown in FIG. 4 by a dotted line. Through the calibration of the vehicle dynamics sensor based on the error budget 94, the high quality of the external positional data 14 is used to improve the quality of an internal sensor, in this case the vehicle dynamics sensor 35, and thus of the corresponding sensor signal, in this case the vehicle dynamics data 33, in the vehicle 2.

The wheel speed sensors 32, of which, for the sake of brevity, only one is shown in FIG. 4, could also be calibrated in the same way.

The invention claimed is:

1. A method for calibrating an internal sensor in a vehicle with an external sensor which is arranged in a parking facility, comprising:
    detecting, by the external sensor, external positional data based on a position of the vehicle;
    sending the external positional data to the vehicle; and
    calibrating internal positional data of the vehicle detected by the internal sensor and dependent on the position of the vehicle by a filter, based on a comparison between the internal positional data and the external positional data.

2. The method according to claim 1, wherein the external sensor is arranged in a multi-storey parking lot, for tracking the vehicle.

3. The method according to claim 2, wherein the external sensor is part of a guidance system for the vehicle in the multi-storey parking lot, to guide the vehicle into a parking space in the multi-storey parking lot.

4. The method according to claim 1, further comprising checking the internal positional data with the calibrating based on the external positional data.

5. The method according to claim 4, further comprising:
    calibrating a sensor detecting the internal positional data in the vehicle based on the checking.

6. The method according to claim 1, wherein the external positional data describes an absolute position of the vehicle.

7. The method according to claim 6, further comprising:
    providing the positional data describing the absolute position to a receiver of a Global Navigation Satellite Signal or GNSS.

8. A control device for carrying out a method according to claim 1.

9. A vehicle, comprising a control device according to claim 8.

10. A system for carrying out a method according to claim 1.

* * * * *